Patented Oct. 1, 1946

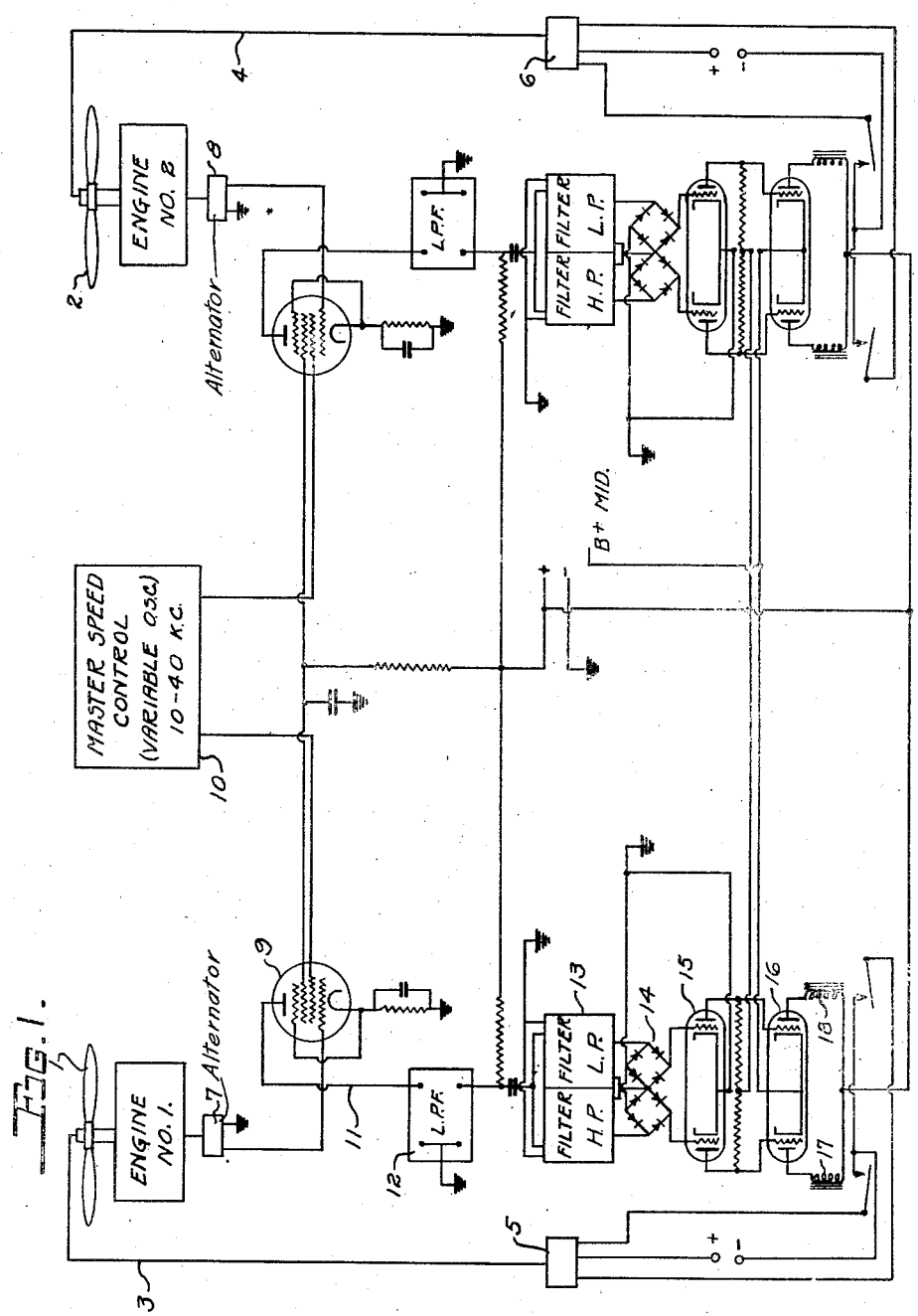

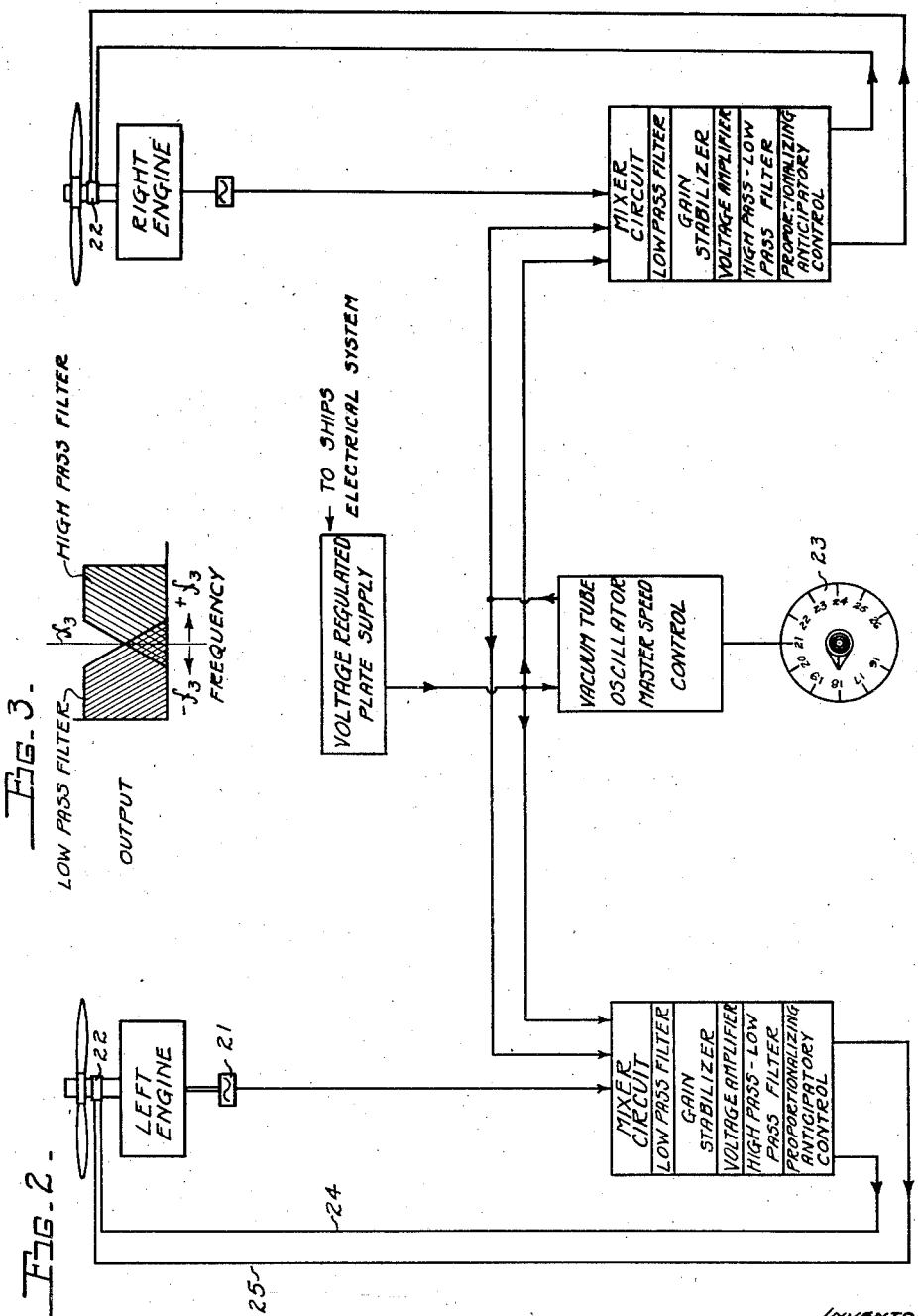

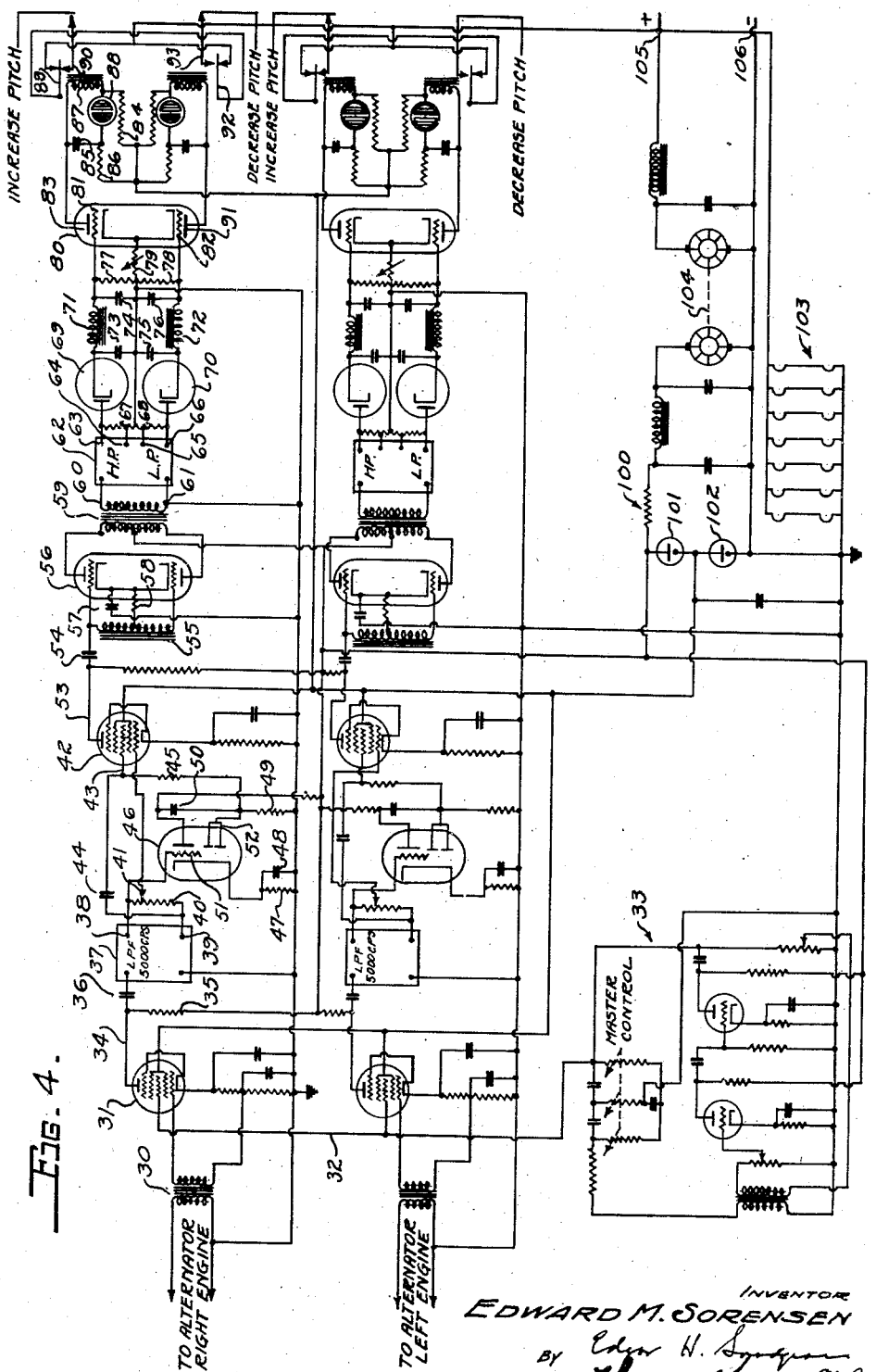

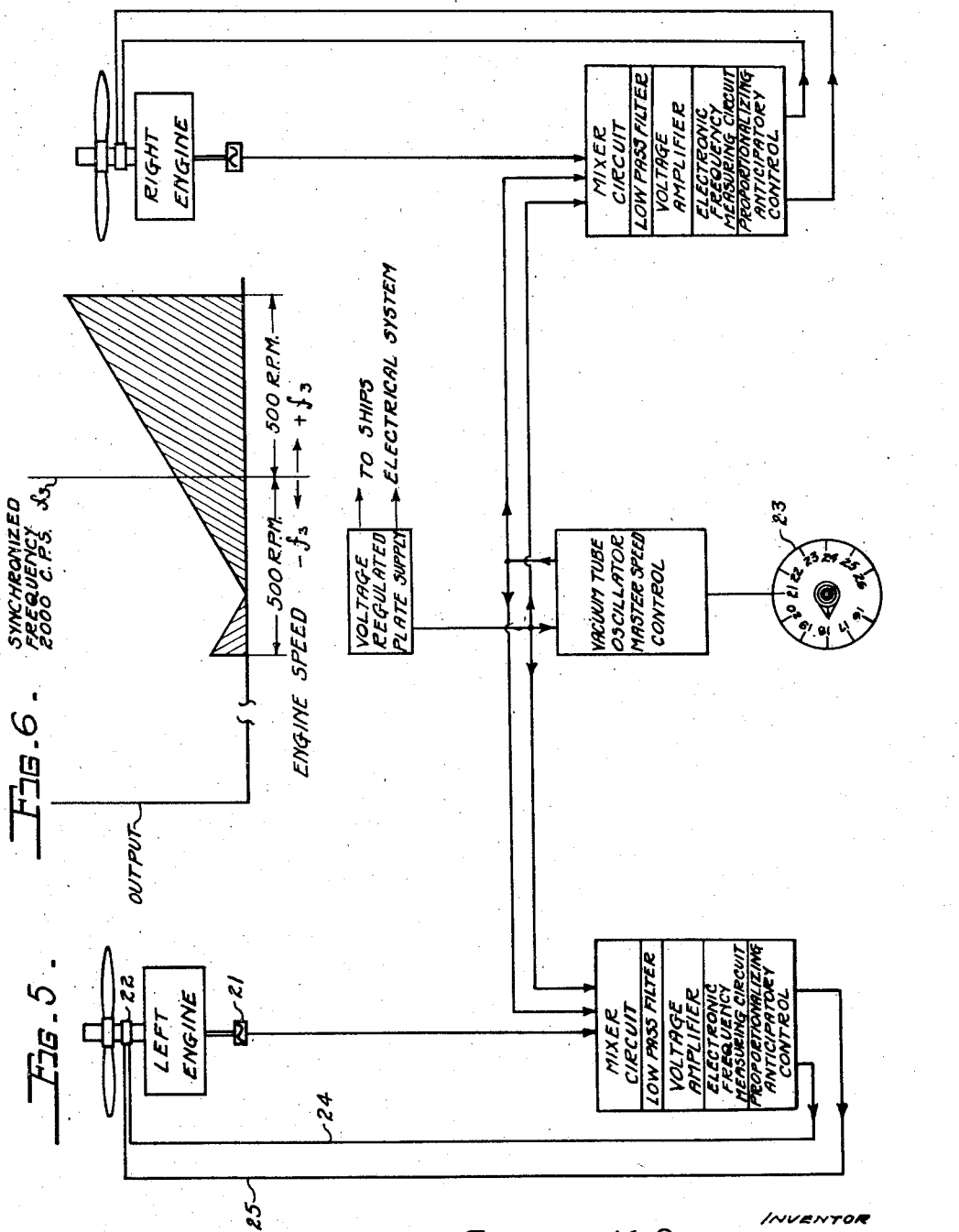

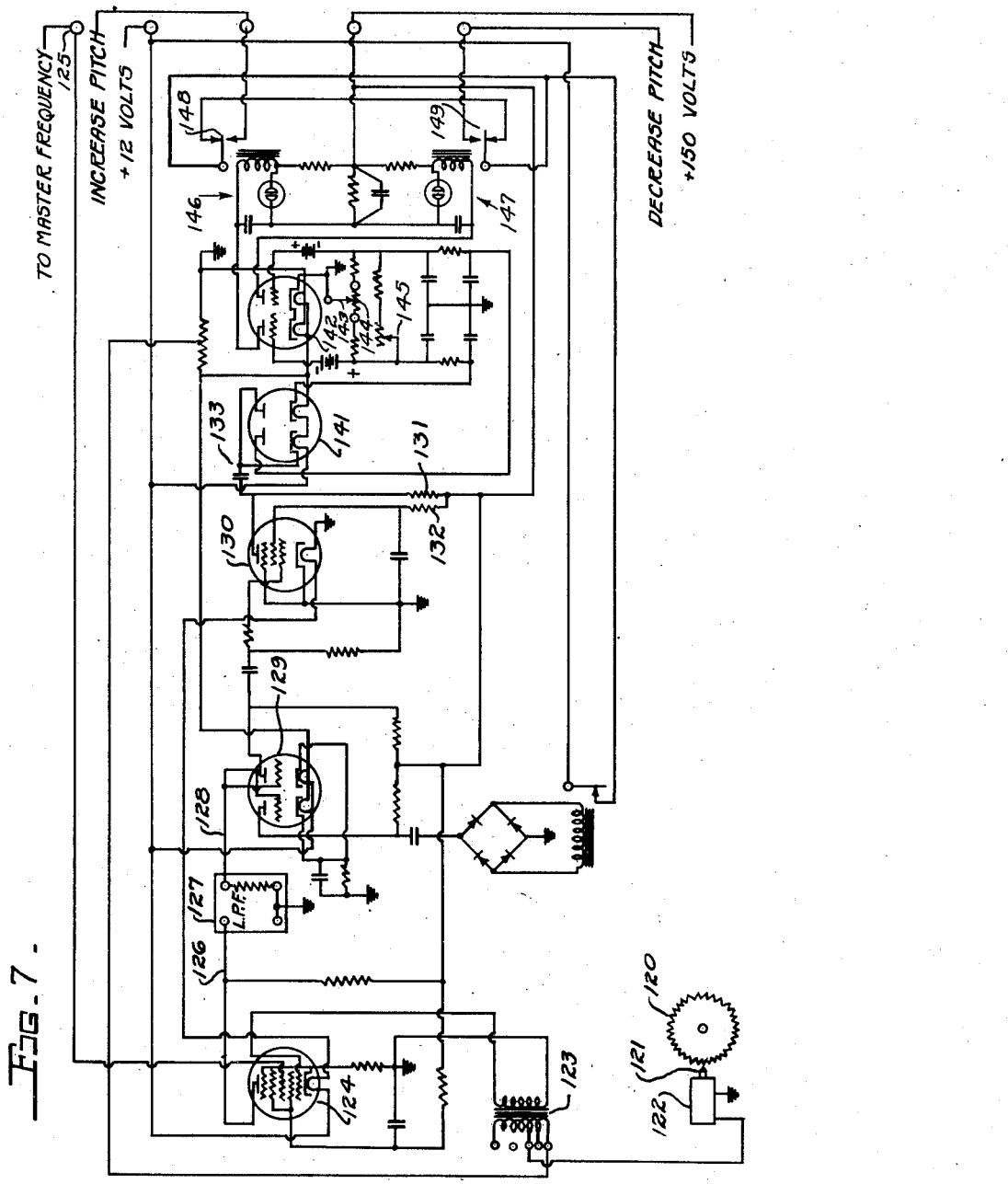

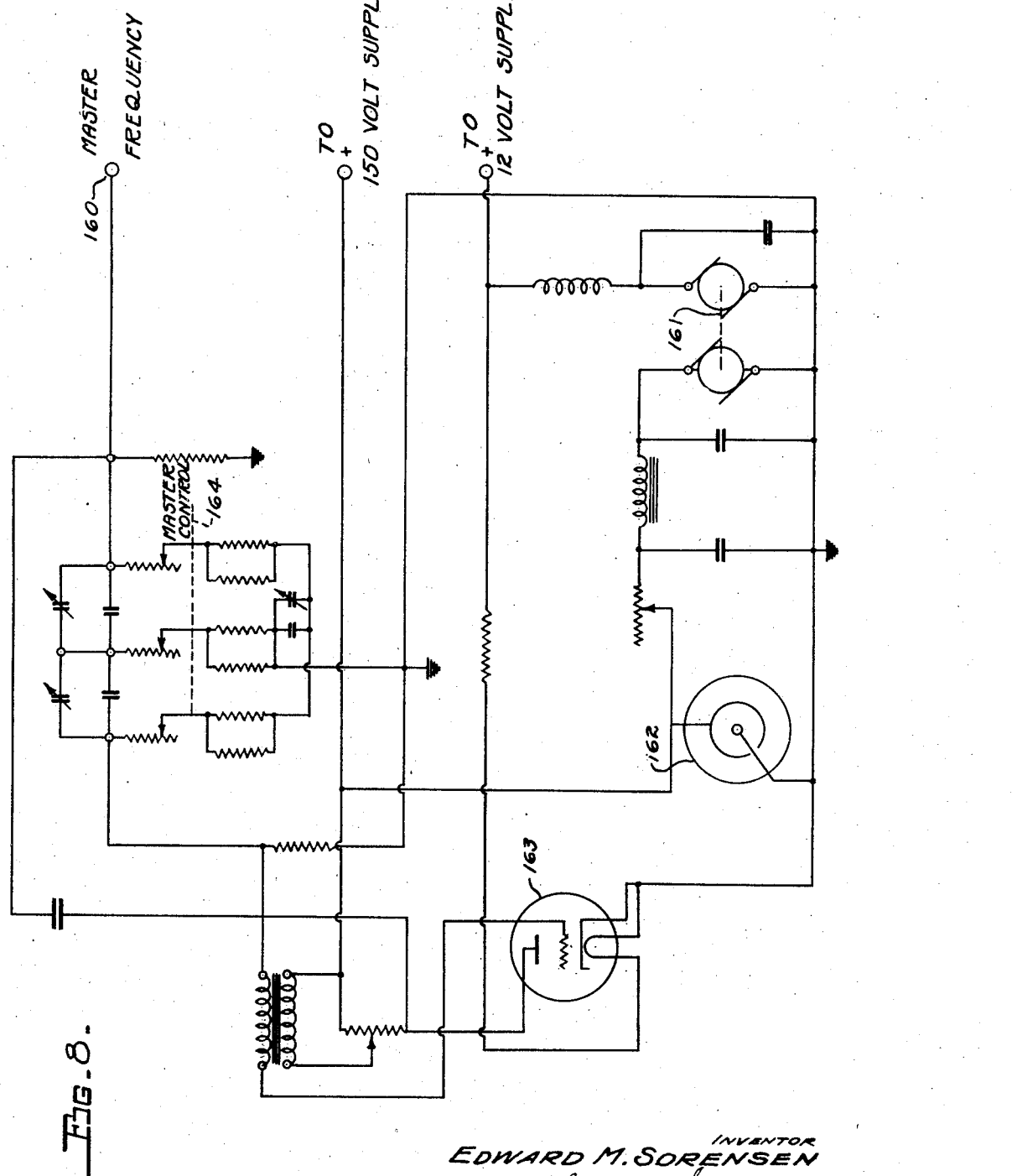

2,408,451

UNITED STATES PATENT OFFICE 2,408,451

SPEED CONTROL SYSTEM

Edward M. Sorensen, Dayton, Ohio

Application December 23, 1940, Serial No. 371,368

9 Claims. (Cl. 60—97)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an electrical system for effecting speed control, and has particular reference to the speed control of aircraft engines and the like.

The general object of the invention is to provide an improved method and apparatus for controlling the speed of revolving or reciprocating parts.

A particular object is to accurately control the speed of an engine such as an airplane engine or the like.

A further object is to effect synchronization of the speeds of the engines in a multi-engined airplane by providing an improved system for adjusting the pitches of controllable pitch propellers driven by said engines.

Broadly stated, the principle of the invention involves the generation of an alternating electrical voltage having a frequency proportional to the speed of the engine to be controlled, this frequency being caused to beat against a master frequency generated preferably, though not necessarily, by a controllable oscillator. The master frequency is adjusted to produce a given beat frequency at the desired engine speed when mixed with the alternator frequency generated by the engine. Thus the first step in the present system is performed by a mixer circuit having an output of three mixed frequencies, namely, the master frequency, the engine alternator frequency, and the resulting beat frequency. At this point a low-pass filter is provided to suppress the original, or incoming frequencies, which are relatively high frequencies, and to pass the beat frequency, which is a relatively lower frequency. The beat frequency is caused to exert a control effect upon the engine to maintain this frequency constant at the proper value to establish the desired engine speed. The control effect may be produced by a frequency measuring circuit, by a high-pass-low-pass filter combination, or by other frequency discriminating means. Suitable relay circuits are energized by the control effect to increase or decrease the pitch of a controllable pitch propeller, as required, to keep the engine speed within the desired limits. Means are provided to anticipate the magnitude of control effect required to correct each deviation in engine speed to make the adjustment rapid and at the same time to prevent hunting. The latter means are more completely shown and described in my copending application entitled "Proportionalizing anticipatory control," Serial No. 409,702, filed September 5, 1941. This system may be extended indefinitely to control any number of engines from a single master oscillator.

Synchronizing systems have been heretofore proposed utilizing one of the engines as the master, and adjusting the speeds of the remaining engines to conform therewith. Such systems in aircraft are objectionable on several grounds. In the first place, should the master engine fail, all the engines will stop. Also, in such systems the control effect will be called upon to change the speeds of all engines in accordance with variations in the speed of the master engine, in addition to the corrections which would be required by the variations in the controlled engines. In the system of the present invention failure of any engine will not affect the operation of the remaining engines. Also, in the present system the corrections applied to each engine are only those required by its own variations, which corrections will manifestly be less frequent and smaller in magnitude than if they compensated also for variations in the master engine.

Additional objects and advantages will be apparent as the description proceeds in connection with the accompanying drawings illustrating a number of preferred embodiments of the invention.

In the drawings,

Fig. 1 is a schematic diagram illustrating one embodiment of the invention,

Fig. 2 is a block diagram of a system basically similar to Fig. 1, but including certain additional refinements, Fig. 3 is a graphical representation of the action of the high-pass-low-pass filter combination, Fig. 4 is a wiring diagram for the system shown in Fig. 2, Fig. 5 is a block diagram of a modification including further refinements.

Fig. 6 is a graphical representation of the action of the electronic frequency measuring circuit shown in Fig. 5, Fig. 7 is a wiring diagram for the control part of the system shown in Fig. 5, and Fig. 8 is a wiring diagram for the power supply and master oscillator shown in Fig. 5.

Referring now particularly to Fig. 1, there is shown an embodiment of the invention applied to a two-engined airplane for purposes of illustration. Engine No. 1 drives a controllable pitch propeller 1, and engine No. 2 drives a controllable pitch propeller 2. The lines 3 and 4 represent electrical conduits carrying conductors for transmitting energy to increase or decrease the pitches of the propellers, this energy being under the control of power relays 5 and 6. Alternators 7 and 8 are driven by the respective engines, these alternators having the characteristic of generating voltages at frequencies proportional to their engine speeds.

Referring to the circuit for the control of engine No. 1, alternator 7 develops a voltage at a frequency proportional to the speed. The output of this alternator is fed into one of the grids of vacuum tube 9 which has another grid energized by a master speed control 10. The master speed control 10 comprises a variable oscillator for generating a constant frequency, the value of which may be adjusted by conveniently manipulable means. The frequency of this oscillator is adjustable over a considerable range, but remains constant for the frequency at which it has been adjusted. The vacuum tube 9 operates to mix the frequency of the alternator 7 with the frequency from the master speed control 10, producing in the output circuit 11 a voltage at a frequency equal to the difference between the frequencies of the alternator and master control. In the output circuit 11 are also present the frequencies of the alternator 7 and the master control 10. The last two named frequencies are eliminated by low-pass filter 12 on the input side of a high-pass-low-pass filter combination 13.

The frequency at which the output of the high-pass-low-pass filter combination is equal on both filters is herein referred to as the cross-point. If the engine is driving alternator 7, for example, at a speed sufficient to generate a frequency of 15,000 cycles and the master control set to generate a frequency of 13,500 cycles, the difference of these two frequencies is 1500 cycles. The cross-point of the filter combination 13 would then be designed to be 1500 cycles. In the present embodiment this is the relationship desired when the engine is running at its normal operating or cruising speed.

In the event that the speed of the engine increases, alternator 7 increases its frequency thereby making the difference of the frequencies of alternator 7 and master control 10 greater than 1500 cycles. Hence, since the output circuit 11 of tube 9 has a frequency higher than 1500 cycles, the high-pass filter will have a greater output and the low-pass filter will have a lower output than when the frequency difference is 1500 cycles. The voltage output from the filter combination 13 is rectified by rectifiers 14 and the output of the rectifiers is fed into a twin vacuum tube 15, the rectified current being amplified and coupled to twin vacuum tube 16, which provides further amplification to operate the relay 17, the relay 18 remaining inoperative under the assumed condition. This effects operation of the power relay 5 to increase the pitch of the propeller 1 to cause engine No. 1 to decrease its speed, in turn causing alternator 7 to develop a lower frequency, which correcting action will continue until the frequency difference between alternator 7 and master control 10 is 1500 cycles, or the frequency of the cross-point of the filter combination 13.

The low-pass filter will have a greater output than the high-pass filter when the engine speed decreases, so that the difference between the frequency of alternator 7 and master control 10 will then be less than 1500 cycles. When this occurs the electronic circuits in tubes 15 and 16 cause operation of the relay 18 to actuate power relay 6 to decrease the pitch of the propeller 1, thereby permitting the engine to gain speed until the desired speed is reached. The relay 17 remains inoperative or in open circuit position when relay 18 is operative or in closed circuit position.

The control system for engine No. 2 is identical in function and operation to the system just described for engine No. 1. The system may be multiplied indefinitely to control any number of engines or rotating elements to synchronize with the master speed control. In this way the speeds of all the engines may be adjusted simultaneously to the desired value, and synchronization of all the engines is automatically accomplished for any speed selected on the master speed control. It will be appreciated that when the frequency of oscillator 10 is changed to a value different from 13,500 cycles, the engine alternator frequency, and hence the engine speed, will have to change by a corresponding amount to maintain the beat frequency at the cross-point value of 1500 cycles. Hence, the adjustable control on oscillator 10 may be calibrated in terms of engine revolutions per minute.

The block diagram in Fig. 2 illustrates an embodiment of the invention employing the basic principles of the system illustrated in Fig. 1, but containing additional refinements facilitating nicety of adjustment and providing smoother synchronizing action without hunting. Numeral 21 represents an alternator directly connected to the left engine for generating an alternating voltage having a frequency proportional to the speed of the engine, and 22 indicates an electrically controlled pitch-changing mechanism for changing the pitch of the propeller driven by the left engine. The right engine contains the same features.

In this diagram it is seen that a voltage regulated plate supply is obtained from the ship's electrical system for energizing the vacuum tube oscillator master speed control. The speed control is provided with means 23 for varying the frequency of the oscillator to establish the engine speed desired. As in Fig. 1, the frequency from the engine alternator is mixed in a mixer circuit with the frequency from the oscillator or master speed control. A low-pass filter is provided, performing the function, as described in connection with Fig. 1, of eliminating the engine and master oscillator frequencies and passing only the beat frequency, or the difference between the two input frequencies. The output of the low-pass filter is fed into a gain stabilizer, the function of which is to maintain the voltage of the beat frequency at a constant value irrespective of voltage variations in the master oscillator or the alternator. A voltage amplifier is provided at this point to increase the signal strength of the beat frequency which is then fed into a high-pass-low-pass filter combination which performs the functions described for this element in Fig. 1. Thus far the system of Fig. 2 resembles the system of Fig. 1 with the addition of a voltage regulated plate supply to compensate for voltage fluctuations in the ship's electrical system, and the gain stabilizer for the purpose described. The system of Fig. 2 further differs from the system of Fig. 1 in the provision of a so-called proportionalizing anticipatory control associated with the electronic relay devices for operating the power relays in the propeller pitch-changing circuits 24 and 25. The lines 24 and 25 represent electrical conduits for increasing and decreasing, respectively, pitch of the propeller. As in Fig. 1, the control system for the right engine is identical with the described system for the left engine, and it is further understood that the system may be indefinitely multiplied to control any number of engines or rotating parts.

In the application of speed regulation to the synchronization of airplane engines, it is found expedient to control the speed of the engine by varying the pitch of the propeller in accordance with established practice. It is to be understood, however, that the system is not limited to use with airplane engines inasmuch as it may be used to control or synchronize the speeds of any type of rotating elements, in which case the numeral 22 would indicate the specific means for varying the speed of the particular rotating element under consideration.

In Fig. 3 the action of the high-pass-low-pass filter is illustrated graphically in the form of an ideal diagram showing output plotted against beat frequency. It is desired that the high-pass filter have an abrupt cut-off in the region of the particular value of beat frequency corresponding to the desired operating speed. The low-pass filter likewise should have an abrupt cut-off at this point so that when the two filters are properly coupled together they will constitute a highly discriminating device to select only the band of frequencies they are designed to pass and reject all other frequencies.

If the engine alternator frequency be designated as $f_1$, and the master oscillator frequency as $f_2$, then the beat frequency may be designated as $f_3$, and the following relationship obtains: $f_3=f_1-f_2$. The frequencies $f_1$ and $f_2$ are eliminated by the low-pass filter, leaving only $f_3$ in the input to the high-pass-low-pass filter combination. The particular value of $f_3$ shown in Fig. 3 is the value of the so-called cross-point of the high-pass-low-pass filter combination. Hence, it is seen that frequencies of a value considerably less than $f_3$, represented as $-f_3$, would be passed by the low-pass filter and rejected by the high-pass filter. A frequency of the exact value $f_3$ would be passed equally by both filters, but at considerably reduced output. Upon a slight increase of frequency above $f_3$, represented by $+f_3$, the signal would be rejected by the low-pass filter and passed with a high output through the high-pass filter.

The wiring diagram for the system of Fig. 2 is shown in detail in Fig. 4. The alternator voltage for the right engine, having a frequency proportional to engine speed, is fed into transformer 30, said transformer functioning as a voltage-increasing device. The output of transformer 30 is fed into one of the grid circuits of vacuum tube 31 and another of the grid circuits in vacuum tube 31 is fed by wire 32 from a master speed control oscillator system indicated generally by the reference numeral 33, the frequency of the master speed control oscillator 33 being N cycles lower or higher than the frequency developed by the engine alternator at the normal operating speed. Vacuum tube 31 mixes these two frequencies together, and in the plate circuit 34 is present the frequency developed by the alternator, frequency developed by the master speed control oscillator 33, and the difference of the two frequencies or the beat frequency.

Resistor 35 functions as a plate load resistor and provides a means to supply plate voltage to the tube 31. Condenser 36 functions as a voltage-blocking device to isolate the D. C. voltage from low-pass filter 37, and provides a path for the alternating voltage. The low-pass filter 37, as in the previously described embodiment, eliminates the frequencies developed by the alternator and master speed control 33, allowing only the frequency difference, or beat frequency, to pass through. This beat frequency is present across the terminals 38 and 39. Resistor 40 functions as a voltage-dividing network, the contact 41 being adjustable to supply the required amount of voltage to one of the control grids in the vacuum tube 42.

Another one of the grids in tube 42 is connected by a lead 43 to a gain stabilizer circuit comprising the condenser 44, the resistance 45, vacuum tube 46, resistance 47, condenser 48, resistance 49, and condenser 50. This gain stabilizer circuit functions in the following manner: Grid 51 of vacuum tube 46 has applied to it the voltage present across the terminals 38 and 39, this voltage being both amplified and rectified by the tube 46, the rectification being accomplished by diode plates 52. As the signal strength across terminals 38 and 39 increases, the rectified voltage present across resistor 49 increases, the polarity of said voltage being negative at the diode plates 52 with respect to ground, said negative voltage being applied to the grid on the lead 43, in tube 42. This biases down the tube 42 and holds its gain in the output circuit 53 flat for approximately a six decibel shift in voltage present across terminals 38 and 39. In this manner, any change in voltage within six decibels can take place between the alternator and master speed control oscillator 33 without affecting output circuit 53 of the tube 42.

A condenser 54, having two functions, is provided. It blocks out the D. C. voltage applied to the plate of tube 42 and acts as a series tuned circuit with one-half of the winding on a choke 55, this circuit being tuned to approximately 25 cycles for the purpose of building up the low frequency response in an amplifier tube 56. At frequencies above 25 cycles, condenser 54 functions as a D. C. voltage-blocking device and as a coupling device for the A. C. voltage, tube 56 being a twin triode which functions as a push-pull amplifier. The components completing this particular circuit are: Condenser 54, choke 55, condenser 57, resistance 58, and transformer 59.

The output terminals 60 and 61 of transformers 59 provide an impedance match into the high-pass-low-pass filter 62. In the present embodiment this filter has a 1500 cycle cross frequency, meaning that at 1500 cycles the high-pass terminals 63 and 64 have the same voltage across them as the low-pass terminals 65 and 66, the input of these two filters being connected in parallel and the outputs separated. The output of the high-pass-low-pass filters at the cross frequency of 1500 cycles is preferably approximately ten decibels below zero level, with zero level set at approximately ten volts. Thus, if the frequency is greater than 1500 cycles the voltage across the high-pass terminals 63 and 64 will be greater than the voltage present when 1500 cycles was applied to the input terminals; and the voltage applied to the low-pass terminals 65 and 66 will be lower. Resistors 67 and 68 load the filter at its characteristic impedance.

The diode tubes 69 and 70 serve to rectify the voltage of the output of the high-pass filter and the low-pass filter, respectively, said rectified voltage being filtered by the respective components, comprising chokes 71 and 72 and the associated condensers 73, 74, 75, and 76. The resistor 77 acts as a load for the rectifier of the high-pass filter, resistor 78 acting as a load for the low-pass filter. Potentiometer 79 serves as a sensitivity control, operating in conjunction with a twin triode tube 80. Grid 81 of the tube 80 is connected to the rectified output of the high-pass filter. Grid 82 is connected to the rectified output of the low-pass filter.

When the frequency is greater than 1500 cycles, the rectified output of the high-pass filter is greater than at 1500 cycles, causng plate 83 to draw more current, resulting in greater voltage drop across resistor 84, this greater voltage drop being present across condenser 85, the path for charge of this condenser being completed through resistor 86. When the voltage across condenser 85 becomes sufficient to ionize neon tube 88, the condenser discharges through tube 88 and relay coil 87, energizing the latter. This causes an actuation of the relay arm 89, making contact at 90, causing a momentary circuit to be made to actuate the pitch control mechanism of the controllable pitch propeller, so as to effect an increase in pitch of said propeller. When the voltage present across condenser 85 drops below the de-ionization value of the neon tube 88, relay arm 89 drops back and remains in that position until condenser 85 has restored itself to a charge equal to the ionization potential of the neon tube 88, except in the special case to be presently stated.

It is noted that an increase in the current flowing in plate 83 of tube 80, resulting from a greater voltage present on grid 81 of said tube, causes a more rapid action in the proportionalizing anticipator circuit comprising the following elements—condenser 85, neon tube 88, relay coil 87, resistor 84, and resistor 86—until a current is flowing in the plate 83 of an amount sufficient to hold relay arm 89 down permanently against contact 90. This contact is maintained until sufficient change in pitch has occurred to lower the speed of the engine so that the engine alternator has changed its frequency to a value such that the difference between this value and the master frequency will be less than an equivalent of 30 R. P. M. from synchronization speed. It has been found in practice that a 30 R. P. M. departure from synchronous speed is the most desirable speed from which to start the proportionalizing action. It is understood, however, that this value may be selected with particular reference to the nature of the engine or rotating element to be controlled, as well as to the precision of synchronization necessary.

Plate 91 in tube 80 produces a corresponding action in response to the value of grid potential on the grid 82 associated with the low-pass filter to operate the relay arm 92 to complete a circuit with the contact 93 to decrease the propeller pitch.

The elements not mentioned by reference character identification in the synchronizing system for the right engine function in a manner well-known in the art and are deemed to require no further description. The system associated with the left engine is identical in structure and function to the circuit described for the right engine and will not be described in detail.

The power supply indicated generally at 100 is conventional and provides voltage regulation through the use of two voltage regulator tubes 101 and 102, supplying preferably 210 volts D. C. at 100 milliamperes. The filament circuits for the various tubes are shown in series parallel arrangements at 103. Numeral 104 represents a dynamotor powered by the ship's supply connected to terminals 105 and 106.

The master speed control 33 may be described briefly as employing a regeneration-degeneration three-terminal Wien bridge to generate an alternating voltage. This circuit is fully described in the February 1938 issue of the "Proceedings of the Institute of Radio Engineers," on page 226.

The block diagram in Fig. 5 illustrates a further modification similar to the embodiment just described, but employing an electronic frequency measuring circuit in place of the high-pass-low-pass filter frequency discriminating means. Similar reference characters have been used to designate parts identical with parts described in Fig. 2. In the embodiment of Fig. 5 it will be seen that the beat frequency passed by the low-pass filter is fed directly through a voltage amplifier to the electronic frequency measuring circuit without the interposition of the gain stabilizer used in the embodiment of Fig. 2. Use of a frequency discriminating device which obviates the necessity for a gain stabilizer, simplifies the system, and renders it more practical in operation. The manner of providing the voltage-regulated plate supply, the master oscillator, the mixer circuit, low-pass filter and the proportionalizing anticipatory control are substantially the same as described in Fig. 2.

Fig. 6 illustrates graphically the action of the electronic frequency measuring circuit, showing output plotted against engine speed and embracing the working part of the curve on both sides of the selected synchronized frequency which is here represented as 2000 cycles per second, or $f_3$. It is noted that the ouput curve descends to zero and then increases as a substantially linear function of frequency, or speed, as the latter increases. The point at which the output is zero corresponds to the engine speed which produces an alternator frequency equal to the master oscillator frequency, resulting in zero beat frequency. This part of the curve lies well below the normal operating range of the engine, where automatic regulation is not essential, insuring that the automatic regulation will be effective through all ranges of speeds above the normal operating range, to prevent running away of the engine.

The legends—$f_3$ and $+f_3$ represent respectively, ranges of values of beat frequency below and above the synchronization frequency, $f_3$.

Fig. 7 is a wiring diagram for the system illustrated by block diagram in Fig. 5. The structure of a preferred form of alternator is illustrated diagrammatically by the toothed disc 120 rotating closely adjacent the tip 121 of the core of a coil 122. The disc 120 is directly connected with the engine so as to rotate at a speed proportional thereto and is provided with 192 teeth to vary the flux in the pole piece 121. Hence, for every revolution of the disc, 192 cycles are developed, and, at approximately 4800 R. P. M., a frequency of 15,000 cycles is developed. The wave form of this voltage is found to be very good for the present purpose.

The alternator frequency is transmitted through a coupling transformer 123 to a part of the grid control circuit in the tube 124, comprising a frequency mixing device. The master frequency introduced through the terminal 125 is also fed into the tube 124; the master frequency, the alternator frequency, and the resulting beat frequency being then transmitted by the conductor 126 to a low-pass filter 127 in the manner described in the previous embodiments. The low-pass filter passes only the beat frequency through the output conductor 128 to the amplifier 129 and associated elements.

The strengthened signal from the voltage amplifier 129 is then fed into an electronic frequency measuring circuit. The electronic frequency measuring circuit consists of a sharp cut-off pentode 130 whose control grid is connected to the source of voltage whose frequency it is desired to measure in a quantitative manner. In the plate circuit of pentode 130 is a conventional series plate resistor 131, and in the screen circuit of said pentode is a suitable voltage dropping resistor 132. The plate circuit is coupled with a given value of capacity in condenser 133, through a rectifier circuit which could be compared to a given value of resistance. The value of this resistance of the rectifier circuit is held constant.

The voltages applied to the grid of pentode 130 are of magnitudes so as to depart from a linearity of reproduction in said plate circuit of pentode 130. In effect this changes the wave form of the A. C. voltages applied to the grid to produce a substantially square top wave. The condenser 133, which is coupled from the plate circuit to the said rectifier circuit, will charge to a given value, determined upon the length of time the square top wave is at a crest of voltage. This length of time is likewise dependent upon the frequency of said wave. When said condenser 133 in the plate circuit is charging, the charging current is also flowing through said rectifier circuit, which includes the tube 141. Thus, the voltage set up across the rectifier circuit, having an A. C. component, is rectified, and the output of said rectifier circuit is proportional to frequency.

It was before mentioned that the input to the grid circuit was of a value to exceed that producing a linearity of response in the plate circuit. As long as a sufficient value equal to or greater than the value which exceeds linear reproduction is maintained, the function of the frequency meter is no longer affected by the amplitude of the signal applied, but is only affected by the frequency of the wave. Thus the output of the rectifier is only affected by the frequency, and is not affected by the amplitude. At a given frequency, the value of the condenser 133 will provide a linear response for a change in frequency. When a given frequency is exceeded, the response of the electronic frequency meter no longer follows a linear function, as shown in the ideal diagram of Fig. 6, but, as the frequency is increased beyond a given point, its output remains practically constant. However, this is beyond the desired limit of operation and does not affect the operational functions of the system as set forth.

A high-mu twin unit triode tube 142 is connected with the rectifier circuit, one of the triode grids being connected with the plate of one of the units of the twin diode 141, and the other grid being connected to the cathode of the other diode unit. The first-mentioned grid is supplied with a positive biasing potential (shown as battery in Figure 7) while the other grid is supplied with a negative biasing potential.

The movable contact 143 on a potentiometer 144 effects sensitivity control, and the adjustable contact 145 constitutes a means for adjusting the speed control. These last named elements being part of a balanced circuit, there is thereby afforded a means of pitch correction for frequency deviation of only one part in 500 when used with a differential or mixing circuit, as described, where the master frequency is mixed with the alternator frequency. This is found to produce change of one part in 250 for an engine speed change of 1 R. P. M., thereby providing an electronic circuit taking the place of the high-pass-low-pass filter combination used in Fig. 4. The system disclosed in Fig. 7 is found to be effective to operate pitch control mechanism of an aircraft engine in response to a speed variation of one-half R. P. M. However, it is not considered that the engines may be held within one-half R. P. M. because of factors such as unavoidable lag in the system, and continual slight variations in the operation of the engines. This sensitivity is based upon an alternator frequency of 7.5 cycles per revolution of the engine, where the frequency measuring circuit is sensitive to a deviation of less than 4 cycles.

In Fig. 7, a proportionalizing anticipator circuit, indicated generally at 146, 147, is provided to anticipate the amount of control needed and thereby prevent hunting as synchronous speed is approached. This proportionalizing anticipator operates the same as the corresponding part of the system shown in Fig. 4, and controls the relay armatures 148 and 149 to vary the propeller pitch as described in the previous embodiment.

The voltage regulated power supply and the master oscillator for use with the system of Fig. 7 are illustrated diagrammatically in Fig. 8. The terminal 160 in Figure 8 connects with the terminal 125 in Fig. 7 to supply the master frequency to the tube 124 of the mixing circuit. The power supply comprises a dynamotor 161 operated by the ship's electrical supply, the output of which is closely regulated by the voltage regulator tube 162. Numeral 163 indicates an oscillator tube of an audio frequency oscillation system generating the master frequency. The numeral 164 designates the master control by which the frequency may be changed to correspond to the desired engine speed. The 150 volt supply in Fig. 8 connects with the corresponding terminal in Fig. 7, and the 12 volt terminals in both of Figures 7 and 8 are connected with the ship's battery. Further explanation of this part of the system is deemed unnecessary as the specific details of the power supply and master frequency generator form no part of the present invention.

It is of course understood that the system of Fig. 7 may be duplicated for each engine of a multi-engined ship, there being an alternator disc 120 associated with each engine. The voltage-regulated power supply, and oscillator, illustrated in Fig. 8, will serve for all the engines on the ship, as in the embodiment of Fig. 4.

The systems herein disclosed accomplish speed regulation broadly, and are designed particularly for synchronizing the speeds of a plurality of aircraft engines or the like. The invention is not intended to be limited, however, either in construction and arrangement or in application, to the specific embodiments illustrated, except as required by the prior art and the scope of the appended claims. The invention is of general application in the field of speed regulations, without regard to synchronization, and may be applied to revolving or reciprocating parts in general. When applied to airplane engines, it is found convenient to regulate the speed by regulating the power output through controllable pitch propellers, but any other speed regulating agency may obviously be controlled by means well-known in the art by the power relays herein disclosed as operating the pitch-changing mechanisms.

I claim:

1. A system for governing a rotating element to maintain a desired speed, comprising an alternator driven by said element to generate a voltage having a frequency proportional to the speed of said element, an electron tube oscillator for generating a constant frequency, a mixing circuit comprising an electron tube having a plurality of grids therein, said constant frequency being impressed upon one of said grids and said alternator frequency being impressed upon another of said grids, a low-pass filter receiving the output of said last named electron tube, said low-pass filter suppressing said first two named frequencies and passing the beat frequency resulting therefrom, a gain stabilizer for maintaining substantially constant the voltage of the beat frequency regardless of voltage variations in the alternator or oscillator circuits, frequency responsive means comprising a high-pass-low-pass filter combination for receiving the beat frequency, and an actuating circuit connected with the output from said high-pass-low-pass filter for correcting the speed of said rotating element in accordance with variations in said beat frequency, said actuating circuit including a proportionalizing control to make the magnitude of said speed correction proportional to the departure from said desired speed.

2. In a system for governing a rotating element to maintain a desired speed, means for generating electrical impulses at a frequency varying significantly with changes in the speed of said element and having a predetermined value at said desired speed, means for varying a voltage in accordance with said variations in frequency, and proportionalizing control means responsive to said varying voltage to exert control effects upon the speed of said element in proportion to the magnitude of the departure from said desired speed, said proportionalizing control means comprising a condenser charged by said voltage, discharge means for said condenser, and a relay for accomplishing said control effects, said relay being energized by the discharge of said condenser.

3. A speed governing system for causing a rotating element to maintain a predetermined, constant speed comprising means operatively connected with said element for generating electrical oscillations whose frequency is proportional to the speed of said element, a second electrical oscillation generating means for producing oscillations of a predetermined, constant frequency, the frequency of said second oscillations being considerably less than the frequency of said first oscillations when said element is rotating at said predetermined speed, means for combining said two oscillations to thereby produce beat frequency oscillations, means for suppressing all but said beat frequency oscillations, a gain stabilizer circuit for maintaining the magnitude of said beat frequency oscillations substantially constant regardless of variations in the magnitude of said first-two-mentioned oscillations, a filter having a high-pass section and a low-pass section for analyzing said beat frequency oscillations, each of said filter sections having a cutoff frequency equal to the beat frequency produced when said element is rotating at said predetermined speed, and means connected with the output of said filter sections for increasing the speed of said element when the output of said low-pass section is greater than the output of said high-pass section and for decreasing the speed of said element when the output of said high-pass section is greater than the output of said low-pass section.

4. The invention as defined in claim 3 wherein said means connected with the output of said filter sections includes a proportionalizing circuit for rendering the rate at which the speed of said element is increased or decreased proportional to the departure of said element from said predetermined speed.

5. A system for synchronizing the speed of rotation of a plurality of prime movers comprising means for generating a voltage of predetermined frequency; an alternator operatively connected with each of said prime movers for generating a voltage having a frequency proportional to the speed of rotation of the prime mover; and means associated with each of said prime movers for maintaining a predetermined speed of operation thereof, said means including a mixing circuit for combining the two aforementioned voltages so as to produce a beat frequency voltage, a frequency analyzing circuit for signifying the deviation of said beat frequency from a predetermined value, and a proportionalizing control circuit for correcting the speed of the prime mover to bring the beat frequency back to said predetermined value, said last named circuit including a pair of circuits each adapted to produce electrical pulses at a rate proportional to the extent of deviation of said beat frequency from said predetermined value, one of said circuits being operable to produce pulses when the deviation is above said predetermined frequency and the other of said circuits being operable to produce pulses when the deviation is below said predetermined frequency, a relay connected with each of said pulse producing circuits, and an electrical device controlled by said relays for increasing or decreasing the load on the prime mover in accordance with and in proportion to the increase or decrease of the speed thereof from said predetermined speed.

6. A system for synchronizing the speed of rotation of a plurality of prime movers comprising means for generating a voltage of predetermined frequency; an alternator operatively connected with each of said prime movers for generating a voltage having a frequency proportional to the speed of rotation of the prime mover; and means associated with each of said prime movers for maintaining a predetermined speed of operation thereof, said means including a mixing circuit for combining the two aforementioned voltages so as to produce a beat frequency voltage, a frequency analyzing circuit connected with said mixing circuit, said analyzing circuit being adapted to produce two direct current voltages, one of which is proportional to the deviation of said beat frequency above said predetermined value and the other of which is proportional to the deviation of said beat frequency below said predetermined value, said voltages being equal when said beat frequency is equal to said predetermined value, a pair of electrical pulse generating circuits connected with said frequency analyzing circuit, each of said last-named circuits including a condenser adapted to be charged by one of the direct current voltages produced by said analyzing circuit, a means for discharging said condenser, and a relay adapted to be energized by the discharge of said condenser so as to cause said relay to be energized and deenergized at a rate proportional to the value of said direct current voltage, and an electrical device controlled by said relays for increasing or decreasing the load on the prime mover in accordance with and in proportion to the increase or decrease of the speed thereof from said predetermined speed.

7. A system for governing the speed of a rotating element comprising means for generating an alternating current whose frequency is at all times proportional to the rotational speed of said element, means for generating an alternating current of constant frequency, means for mixing said two frequencies so as to obtain a beat frequency therefrom, a low-pass filter connected with said mixing means for suppressing both of the original frequencies and passing only the beat frequency, a gain stabilizer circuit for maintaining the magnitude of the beat frequency substantially constant regardless of variations in the magnitude of the original currents, a high-pass-low-pass filter combination connected with said gain stabilizer circuit for analyzing the value of said beat frequency, and control means connected with said high-pass-low-pass filter combination for correcting the speed of said rotating element in accordance with variations in said beat frequency.

8. The invention as defined in claim 7 wherein said control means includes a proportionalizing circuit for rendering the magnitude of said speed correction proportional to the departure of said element from the correct speed.

9. A system for causing a rotating element to maintain a predetermined speed comprising means for generating an alternating current whose frequency varies significantly with variations in the speed of said element, suaid current having predetermined frequency at said predetermined speed, means for causing two voltages to vary from a normal value in accordance with changes in the frequency of said current above or below said predetermined frequency, one of said voltages being caused to vary directly with said frequency change and the other of said voltages being caused to vary indirectly with said frequency change, and a proportionalizing control means responsive to said varying voltage for exerting control effects upon the speed of said element, said control means including a pair of circuits for producing electrical pulses, one of said circuits being adapted to produce pulses at a rate proportional to the increase of one of said voltages above its normal value and the other of said circuits being adapted to produce pulses at a rate proportional to the increase of the other of said voltages above its normal value, a relay connected with each of said pulse-producing circuits, and an electrical device controlled by said relays for increasing or decreasing the speed of said rotating element.

EDWARD M. SORENSEN.